Nov. 20, 1934.   S. PRICE   1,981,570
DUST COLLECTOR FOR DRILLS
Filed Sept. 3, 1932
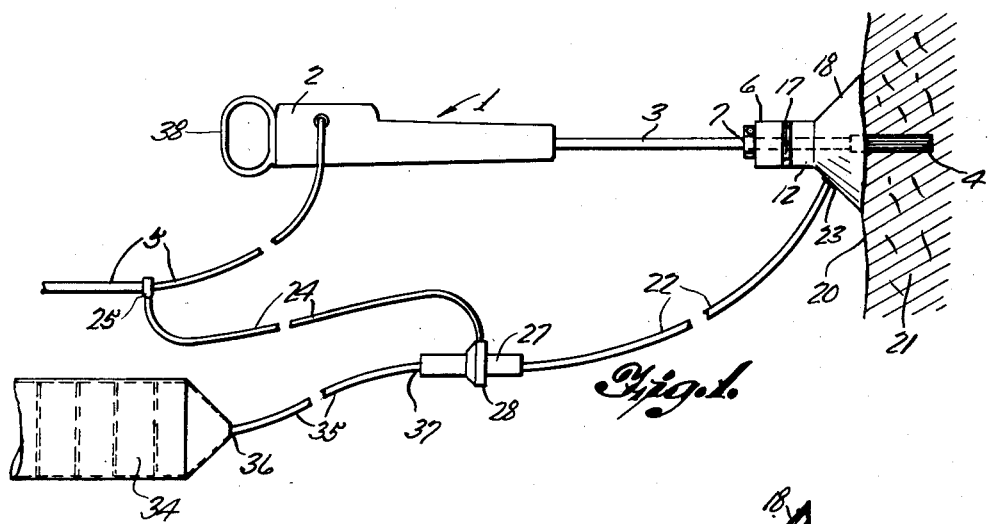
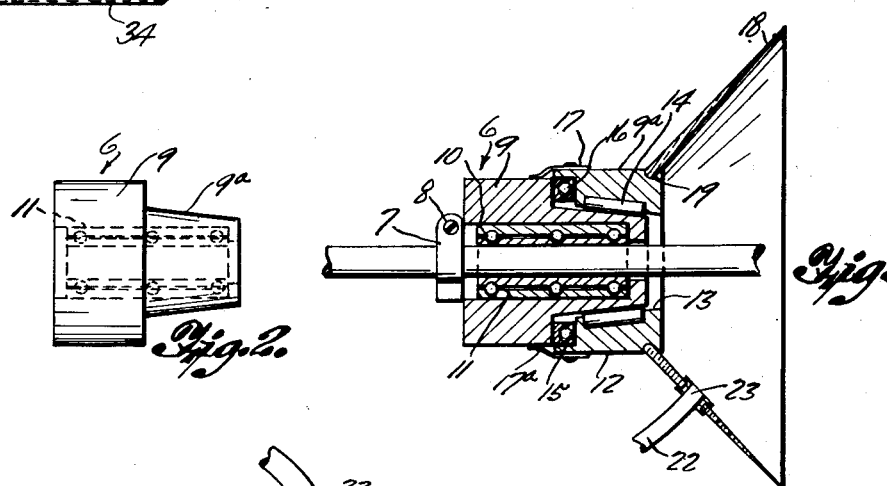
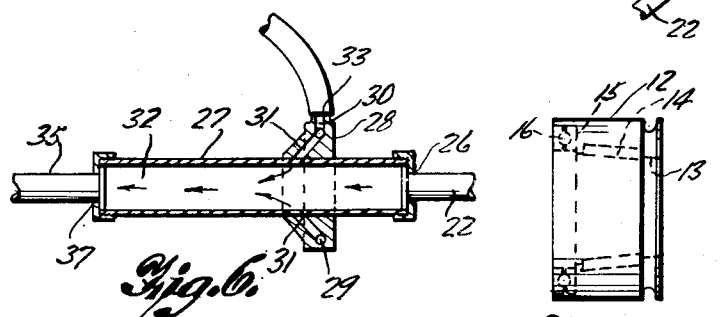
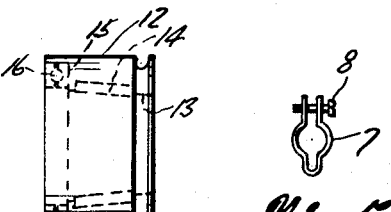
INVENTOR.
STANLEY PRICE
BY Adam E. Fisher
ATTORNEY.

Patented Nov. 20, 1934

1,981,570

UNITED STATES PATENT OFFICE 1,981,570

DUST COLLECTOR FOR DRILLS

Stanley Price, Edwardsville, Pa.

Application September 3, 1932, Serial No. 631,660

1 Claim. (Cl. 255—50)

This invention relates to improvements in dust collectors for rock and mine drills, or for any form of drill operating upon material of such kind or any such a way as to generate dust injurious to the health of the operator.

The chief object of the invention is to provide in a simple and practical form means designed to be carried in part by the drill for collecting and filtering this dust laden air.

Another object is to provide in combination with a standard form of air operated drill, a bearing cone mounted adjacent the end of the drill and adapted to rotate therewith, a dust collecting hood adapted for positioning upon the face of the rock, mine working or other work wherein the hole is being drilled, a housing at the back of the hood adapted to rotatively engage the forward end of the said bearing cone, an air filter, a hose connection leading from the said dust collecting hood, and means operated from the air supply source for creating a suction through the said hose for drawing off the dust laden air from the working drill and leading same into said air filter.

A practical embodiment of the invention is shown in the drawing, wherein

Figure 1 is a side elevation of an assembly embodying my improvement, sections of the hose connections being shown broken out.

Figure 2 is an enlarged detail of the bearing cone for mounting at the end of the drill.

Figure 3 is a longitudinal section on an enlarged scale through the assembly of bearing cone, dust hood and casing at the rear thereof, as mounted at the end of a drill, the latter being shown in full lines and with the ends thereof broken off.

Figure 4 is a detail of the casing for mounting at the rear of the dust hood, for engaging the bearing cone represented in Figure 2, Figures 2 and 4 being on the same scale.

Figure 5 is a detail of the clamp provided for locking the bearing cone forwardly against the cooperating casing at the rear of the dust hood.

Figure 6 is a sectional detail taken through the juncture of the several hose leads.

A conventional form of air operated drill is represented at 1, and includes a housing 2, drill shank 3, bit 4, and air feed hose 5 for feeding compressed air through the housing 2 for operating the air motor (not shown) carried therein. In practicing my invention, I mount a bearing cone 6 slidably upon the outer end of the shank 3 back of the bit 4, and back it up with a suitable form of spring collar or clamp 7 which may be positioned at any point along the shank 3 and frictionally locked in place by means of a thumb screw 8. This bearing cone is thus adapted to rotate with the drill shank and bit. A bearing cone 9—9a provided with a cylindrical ball bearing or cage recess 10, wherein is inserted the ball bearing cage 11, is thus journaled upon the forward end of the shank 3 in front of the collar 7. The reduced cone proper 9a extends forwardly as shown. A housing 12 is recessed conically as shown at 13 for fitting over the cone 9a and a ring of roller bearings 14 is mounted upon the inner periphery of this recess. Additionally the rear, inner, annular margin of the housing 12 is chambered out to form a seat 15 for a ring of ball thrust bearings 16. Thus the housing 12 is rotatively mounted upon the forward end or nose of the cone 9—9a. A dust flange or ring 17 is anchored to the rear annular margin of the housing 12 and has a lip 17ª extended into contact with the portion 9 of the bearing cone, for the purpose of excluding dust from the working parts. A cone-shaped dust collecting hood 18 is seated at its smaller or reduced end in the forward annular margin of the housing 12, as shown at 19. This hood 18 is made of some suitably flexible material such as heavy rubber, rubber covered canvas, or the like, so that it may be seated snugly against the face 20 of the work 21. A length of dust hose 22 is connected by one end at 23 to the hood 18 with which it communicates interiorly, and a shunt air hose 24 similarly connects at 25 with the main air hose 5. The free end of the hose 22 is connected at 26 to one end of a tubular connector 27 which carries a round casing 28 having an annular air passage 29, an air inlet 30 and a plurality of air ducts 31 leading from the passage 29 angularly into the bore 32 of the connector in a direction away from the hose 22. The free end 33 of the hose 24 is then connected to the air inlet 30. A conventional air filter 34 is provided and is joined to the connector 27 by means of a hose 35, as shown at 36 and 37. A handle 38 is provided for the housing 2.

In operation, the apparatus is positioned as represented in Figure 1. The compressed air from any conventional source (not shown) operates the drill through the hose 5. The act of pressing the drill to the work also forces the collar 7 against the cone 9—9a, thereby causing same to rotate upon the bearings 14 and 16, the housing 12, of course, remaining stationary through its connection with the hood 18 which is pressed against the work. The collar 7 has sufficient resiliency to slide back along the drill stem 3 as the bit 4 penetrates the work while at the same time it frictionally engages the stem and holds the bearing cone 6 and adjacent parts in proper engagement. The dust created by the bit is drawn from the hood 18 and projected into the filter 34 by reason of the air suction set up by the current of air diverted through the hose 24 and angularly sprayed into the connector 27. By virtue of the method of construction pointed out, it will be apparent that the hood 18 and housing 12 may be readily withdrawn from the assembly as may be desired, thus leaving the drill free.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

In a dust hood for drills, a bearing cone adapted for free slidable and rotatable mounting on the drill, a housing journaled freely on the bearing cone, a dust flange secured to the housing, a lip on the flange engaging the bearing cone and sealing the junction between cone and housing, the said housing having a peripheral groove adjacent its forward edge, and a conical dust collecting hood having its smaller end seated in the said groove.

STANLEY PRICE.